United States Patent [19]
Miskelley et al.

[11] Patent Number: 5,503,178
[45] Date of Patent: Apr. 2, 1996

[54] PRESSURE RELIEF VALVE, AIRBAG DEPLOYMENT

[75] Inventors: Steven J. Miskelley, Harrison Township; Wilfred Jaeger, Rochester Hills, both of Mich.

[73] Assignee: TRW, Inc., Cleveland, Ohio

[21] Appl. No.: 342,335

[22] Filed: Nov. 18, 1994

[51] Int. Cl.$^6$ .............................. F16K 17/14; B60H 1/28; F24F 11/04

[52] U.S. Cl. .......................... 137/67; 137/512.1; 137/855; 454/165; 454/194

[58] Field of Search ................................... 137/67, 68.11, 137/68.19, 512.1, 855, 68.23; 454/162, 164, 165, 194

[56] References Cited

U.S. PATENT DOCUMENTS

| | | | |
|---|---|---|---|
| 4,612,739 | 9/1986 | Wilson | 137/68.23 X |
| 4,781,106 | 11/1988 | Frien | 454/164 |
| 5,105,849 | 4/1992 | Clough | 454/162 X |
| 5,194,038 | 3/1993 | Klomhaus et al. | 454/162 |
| 5,263,895 | 11/1993 | Kraus et al. | 454/162 |
| 5,355,910 | 10/1994 | Gies et al. | 137/855 X |

*Primary Examiner*—John Rivell
*Attorney, Agent, or Firm*—Fay, Sharpe, Beall, Fagan, Minnich & McKee

[57] ABSTRACT

An apparatus for relieving overpressure conditions in the passenger compartment of a motor vehicle comprises a valve assembly that is mounted in an opening formed in an exterior wall of the compartment, the assembly includes a frame panel sized to fill the opening and having a passage formed therethrough to define an exhaust from the interior of the compartment to the exterior ambient space. Flap valve elements overlying the exhaust for allowing free flow of air in a direction from the interior of the compartment to the exterior while preventing air flow in the opposite direction. Overpressure relief support connectors mount the frame panel in the opening in the wall and are adapted to release the frame panel from its mounted position whenever the air pressure within the compartment exceeds a predetermined minimum level about atmospheric pressure.

14 Claims, 3 Drawing Sheets

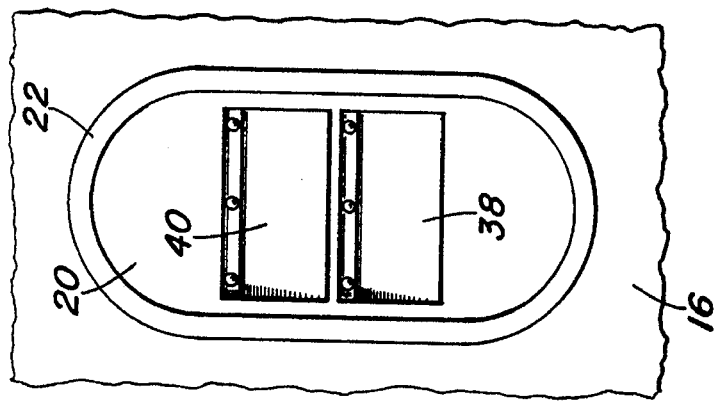
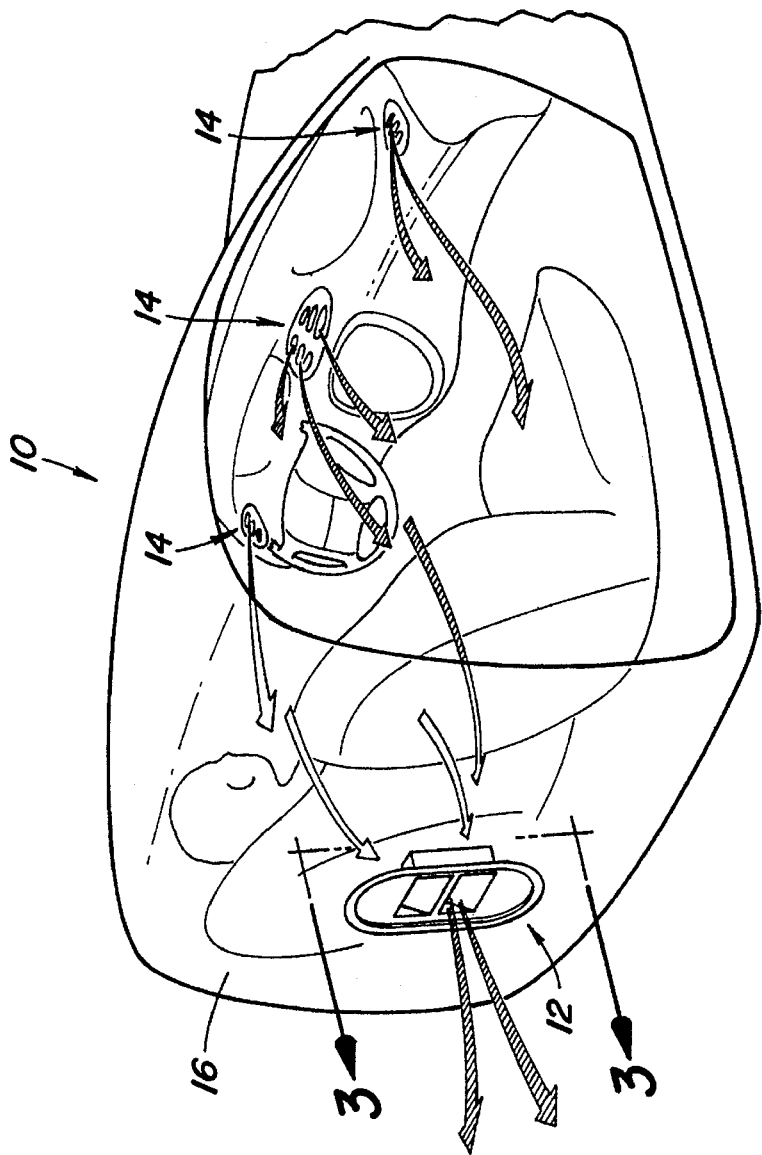

PRESSURE RELIEF VALVE, AIRBAG DEPLOYMENT

BACKGROUND OF THE INVENTION

The subject invention is directed toward the art of pressure relief valves and, more particularly, to a valve structure capable of quickly relieving overpressure surges in motor vehicle passenger compartments.

Many different valve structures have been proposed for providing one-way ventilation in vehicle passenger compartments. Typical designs are shown in U.S. Pat. Nos. 5,263,895, 5,355,910, and 5,105,849. These designs relieve overpressure conditions that might result from heating and air conditioning blower systems, as well as overpressure conditions resulting from door closings. These prior relief valve designs are not, however, entirely adequate to relieve the overpressure conditions generated when a safety airbag is deployed within the passenger compartment. The extent of the problem varies depending upon many factors including the size and design of the passenger compartment, but can be significant.

SUMMARY OF THE INVENTION

The subject invention provides a pressure relief valve arrangement that is especially suited for use in motor vehicle passenger compartments to relieve the large overpressure conditions generated upon airbag deployment. The arrangement is such that an assembly having relatively small valve elements controlling one or more small outlet passages can function to relieve the normal overpressure conditions produced by heating and ventilating systems or by door closing, as well as the large overpressures caused by airbag deployment.

In accordance with the preferred embodiment of the invention, a valve assembly operative for relieving overpressure conditions in a passenger vehicle compartment generally comprises a frame panel adapted for mounting in an opening in a wall of the compartment. Outlet passage means are formed through the frame panel to define an air exhaust passage from the interior of the passenger compartment to the exterior ambient space. A flap valve overlies the air exhaust passage and is arranged for allowing free flow of air in a direction from the interior of the passenger compartment to the exterior while preventing air flow in the opposite direction. The frame panel is provided with support means adapted for mounting the frame panel in the opening in the wall and functioning to release the frame panel from its mounted position whenever the air pressure within the passenger compartment exceeds a predetermined and minimum level above atmospheric pressure. The area of the frame panel is much larger than the total area of the air exhaust passage.

In use, the flap valve acts over the relatively small exhaust passage to relieve normal, minor overpressure conditions as induced by the heating and air conditioning system and/or vehicle compartment door closures. However, upon large and significant overpressure conditions, as can be produced by airbag deployment, the entire frame panel releases from the wall opening to provide a greatly increased opening for passenger compartment air exhaustion. The actual valve portion of the assembly can thus remain relatively small while the safety of a large opening for sudden spikes of overpressure is achieved.

In accordance with a more limited aspect of the invention, the support means includes retention connectors formed about the periphery of the frame panel for direct engagement and connection with the vehicle compartment wall. Preferably, the retention connectors are part of the frame panel and are molded integrally therewith. It is preferable if the frame panel has an outwardly extending flange to overlie the exterior surface of the vehicle compartment wall about the opening so that the panel can resist significant inward pressure and will release from its mounted position only upon pressure applied from the interior of the vehicle compartment.

As can be seen from the foregoing, a primary object of the invention is the provision of a relief valve structure which can handle large overpressure conditions by release of the entire valve and its support panel structures from the mounted condition.

A further object of the invention is the provision of an apparatus of the type described that is simple to install and which can be reinstalled readily after the overpressure condition is relieved.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 1 is a somewhat pictorial view showing a vehicle passenger compartment with a preferred embodiment of the subject valve assembly mounted therein;

FIG. 2 is an enlarged plan view of the valve assembly shown in FIG. 1;

DETAILED DESCRIPTION OF THE PREFERRED EMBODIMENT

Figure 3:
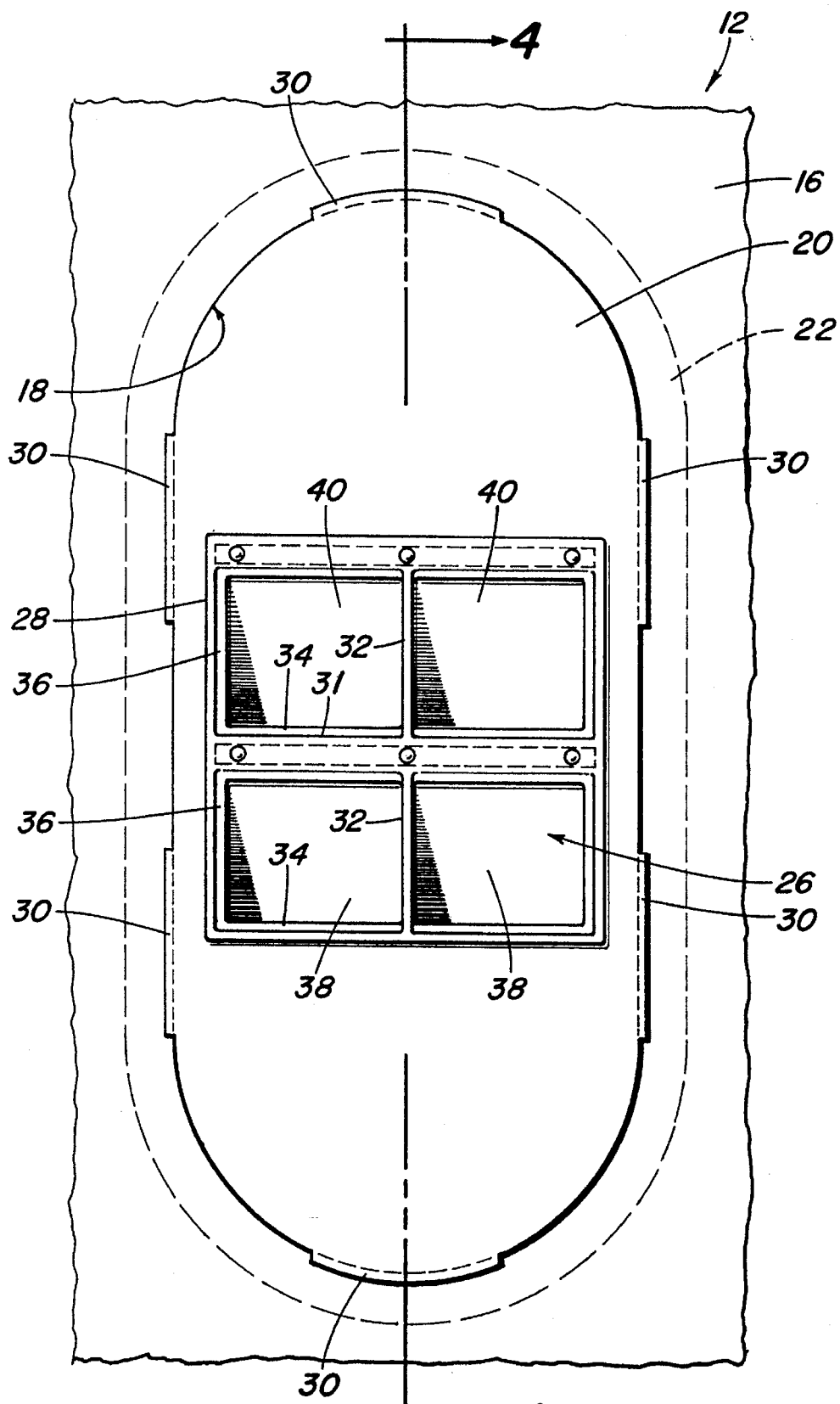
FIG. 3 is a greatly enlarged view of the valve assembly of FIG. 1 (the view is taken from the interior of the vehicle passenger compartment)

Referring now to the drawings wherein the showings are for the purposes of illustrating the preferred embodiment of the invention only and not for purposes of limiting same, FIG. 1 shows in somewhat diagrammatic form a vehicle passenger compartment 10 in which there is mounted an overpressure relief valve assembly 12. The assembly 12 is designed so as to relieve overpressure conditions and allow relatively free circulation of air through the vehicle compartment. Devices of this general type are used so as to allow normal ventilation of the compartment. Air overpressure conditions from the heating and ventilating system are relieved to the exterior of the vehicle compartment.

In the FIG. 1 showing, a plurality of outlets 14 from the heating and air conditioning system are shown somewhat diagrammatically as discharging air into the passenger compartment. The ventilating air is exhausted through the valve assembly 12 mounted in a rear wall 16 of the passenger compartment. The preferred structure and mounting arrangement of the assembly 12 can be best understood by reference to FIGS. 2 through 4. As illustrated therein, the assembly 12 is mounted in a relatively large opening 18 formed in the rear sheet metal wall 16 of the passenger compartment. It should be appreciated, however, that the assembly 12 could be mounted in any suitable wall of the passenger compartment in any general orientation to connect and allow one-way air flow from the interior to the ambient exterior of the compartment. The illustrated valve should preferably be mounted in a vertical orientation, however, to permit the valve flaps to be closed by gravity. The assembly 12 includes a generally flat frame panel 20 that is sized and shaped so as to substantially completely fill the wall opening 18. A suitable radially extending flexible flange 22, the details of which will subsequently be described, extends peripherally outward about the flat center portion of the frame panel 20. As shown, the flange 22 extends radially outward beyond the maximum peripheral extent of the opening 18 and is sealingly engaged with the exterior surface 24 of the wall 16.

Located centrally of the frame panel 20 is a one-way valve mechanism controlling an exhaust passage opening 26 and including flap valves to permit free flow of air from the interior of the passenger compartment to the exterior ambient space. Although the one-way valve mechanism could take a variety of different designs and configurations, it is shown as including a peripheral, generally rectangular flange 28 that extends perpendicular to the plane of the frame panel 20 and generally defines the exhaust passage 26. Carried within the interior of the flange 28 is grid work including a cross piece 31 and inclined vertical brace portions 32 that support inwardly extending valve seat defining sections 34 and 36. Overlying the seat defining sections 34 and 36 are resilient flap valve elements formed from a flexible air-impervious sheet material such as a suitable elastomer. In the subject embodiment, there are two of the flap valve elements 38, 40 that extend transversely across the upper and lower halves of the exhaust passage 26.

The arrangement of the flap valve elements 38, 40 is such that when the unit is installed in the manner shown in FIG. 1, the flap valve elements generally move to the closed position shown solid under the force of gravity because of their inclined relationship. However, upon the occurrence of an overpressure condition within the vehicle compartment, the flap valve elements can move outwardly away from their closed position toward the dotted line position to allow free flow of air from within the vehicle chamber to the exterior thereof.

Normally, a relatively small total open area will relieve all normal overpressure conditions and allow all necessary circulation of air through the passenger compartment. The overpressure conditions resulting from the closing of doors is also freely vented. However, as discussed previously, in vehicle passenger compartments fitted with airbags, airbag deployment can produce significant and extremely rapid air pressure buildups or spikes. The relatively small flap valve arrangements can often not suitably relieve such air pressure conditions and structural damage to the vehicle passenger compartment including actual deformation of the sheet metal walls has sometimes resulted. To assure that the flap valve elements could relieve such significant and large overpressure conditions, it would be necessary to greatly increase their size and the size of passage 26. This would significantly increase the cost of the one-way valve mechanism and result in increased likelihood of dust, dirt, and the like infiltrating into the vehicle compartment.

In the subject invention, such large overpressure conditions are arranged to be released by designing the frame panel which supports the one-way valve mechanism so that the frame panel has an area which is much larger than the area of the exhaust opening. That is, it is preferable that the frame panel be as much as two or more times as great in area as the exhaust opening area 26. This greatly increased area is arranged and mounted so that, upon an overpressure of a predetermined level within the passenger compartment, the entire assembly 12 is readily released from its mounted position in opening 18 allowing the entire area of opening 18 to function to relieve the overpressure conditions.

Figure 4:
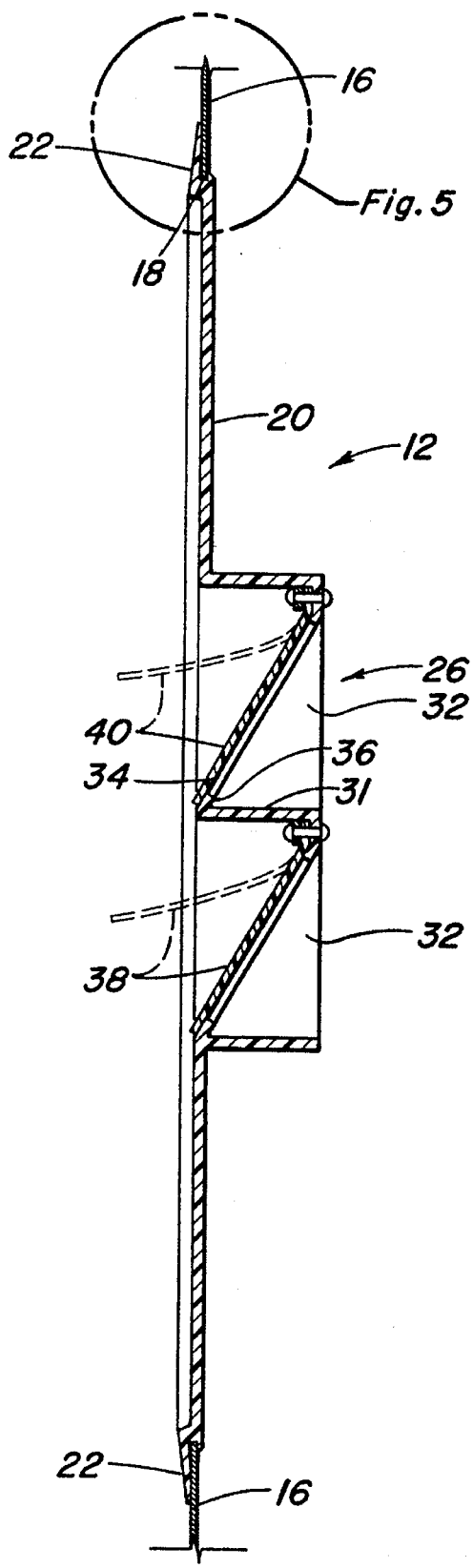
FIG. 4 is a cross-sectional view taken on lines 4—4 of FIG. 3.
Figure 5:
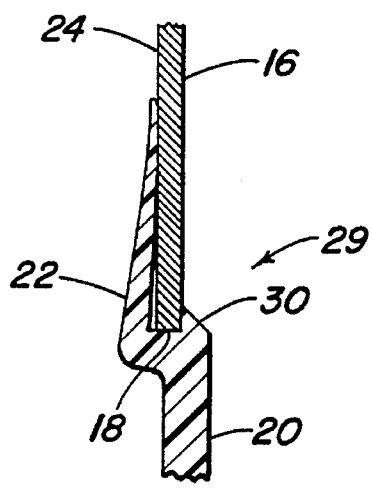
FIGS. 5 and 6 are greatly enlarged cross-sectional views of the circled area of FIG. 5 with FIG. 6 showing the area after removal from the mounted position in the vehicle compartment wall.
Figure 6:
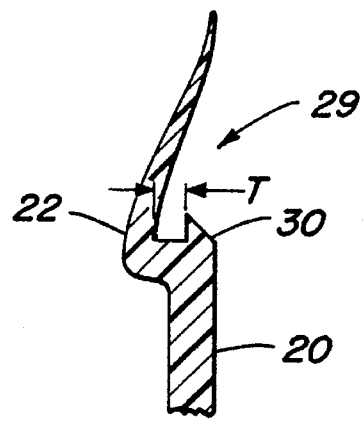

To perform the noted relief function, the frame panel of the subject embodiment is mounted in the opening 18 by overpressure relief support means that allow the frame panel to be expelled outwardly of opening 18. The preferred form of the overpressure relief support means can best be understood by reference to FIGS. 4 through 6. Specifically, these support means comprise retention connectors 29 that are located about the periphery of the frame panel 20. The retention connectors generally include as a part thereof the previously-mentioned peripheral flange 22. The flange 22 is molded to have the general configuration and orientation relative to the main body of the frame panel 20 as best seen in FIG. 6. Preferably, and as seen in FIGS. 2 and 3, the flange 22 is continuous about the outer peripheral edge of the frame panel 20. It could, however, be formed in shorter segments, but it is preferred to have the continuous configuration shown. Additionally, it should be noted that the flange preferably tapers and is inclined relative to the main body as best seen in FIG. 6.

Associated with the flange 22 and spaced therefrom a distance t (see FIG. 6) are retention flange elements 30 that are relatively short in length and have a tapered configuration. Elements 30 are spaced from the flange 22 a distance t which is only slightly greater than the thickness of the wall 16.

Referring to FIG. 3, it will be seen that there are six retention flanges 30 positioned at uniformly spaced locations about the periphery of the frame panel 20. The retention flanges 30 are sized and arranged such that to install the frame panel 20 in the opening 18 it is merely necessary to align the frame panel with the opening 18 from the exterior side of the wall 16 and force it into mounted position. The retention flanges 30 deflect and snap into located position on the inner face of the wall 16. When the flanges 30 have passed into the interior side face the wall 16, they snap into their extended normal position as shown in FIG. 5. At this time, the peripheral exterior flange 22 is deflected into alignment with the main body of the frame panel 20 and applies a sealing bias to the outer lip of the flange which holds the frame panel in the mounted position.

An important aspect of the invention is that the retention flange 30 is sized and related to the opening 18 such that upon occurrence of a predetermined overpressure condition within the passenger compartment, the frame panel 20 will be readily forced outwardly from its mounted position in opening 18. Preferably, the retention flange 30 is sized such that this release or demounting of the frame panel 20 occurs without damage to the wall and whenever the pressure within the passenger compartment exceeds atmospheric pressure by approximately 1.25 psi. This could, of course, be varied significantly by lengthening or shortening the circumferential extent of the flange 30. Consequently, the entire frame panel is arranged to move from within the opening 18 and allow this entire opening to function as an air relief opening upon the occurrence of the noted overpressure condition. Thus, when airbags are deployed within the passenger compartment, a sudden large air pressure spike is avoided and a large full opening is provided for air pressure relief. This takes place extremely rapidly so no damage is done to the vehicle passenger compartment walls or the like. The advantage of the subject device is that the constantly functioning one-way valve mechanisms can be made relatively small and still perform their normal intended functions while the more massive air flow required for preventing overpressure conditions upon airbag deployment is taken care of by the release of the entire assembly from opening 18.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a motor vehicle having a passenger compartment defined at least partially by a wall, a valve assembly operative for relieving overpressure conditions in the compartment, said valve assembly including a frame panel mounted in an opening in said wall to fill the opening, at least one passage formed through the frame panel to define an exhaust passage from the interior of the passenger compartment to the exterior ambient space, a flap valve overlying the passage for allowing free flow of air in a direction from the interior of the passenger compartment to the exterior while preventing air flow in the opposite direction, and overpressure relief support means mounting the frame panel in the opening in said wall for releasing the frame panel from its mounted position in the opening in said wall whenever the air pressure within the passenger compartment exceeds a predetermined minimum.

2. The invention as defined in claim 1 wherein the overpressure relief support means comprises retention connectors about the periphery of the frame panel.

3. The invention as defined in claim 2 wherein the retention connectors are an integral part of the frame panel.

4. The invention as defined in claim 1 wherein the cross-sectional area of the said opening in the wall is significantly larger than the cross-sectional area of the exhaust passage.

5. The invention as defined in claim i wherein the frame panel is molded of plastics material.

6. In a motor vehicle having a passenger compartment defined at least partially by a wall having an interior surface and an exterior surface, a valve assembly operative for relieving overpressure conditions in the compartment, said valve assembly including a frame panel mounted in an opening in said wall to fill the opening, at least one passage formed through the frame panel to define an exhaust passage from the interior of the passenger compartment to the exterior ambient space, a one-way valve mechanism associated with the passage for allowing free flow of air in a direction from the interior of the passenger compartment to the exterior while preventing air flow in the opposite direction, and support means mounting the frame panel in the opening in said wall for releasing the frame panel from its mounted position in the opening in said wall whenever the air pressure within the passenger compartment exceeds a predetermined minimum.

7. The invention as defined in claim 6 wherein the support means comprises retention connectors about the periphery of the frame panel resiliently engaged with the wall.

8. The invention as defined in claim 7 wherein the retention connectors and the frame panel are molded from plastic.

9. The invention as defined in claim 6 wherein the cross-sectional area of the said opening in the wall is significantly larger than the cross-sectional area of the exhaust passage.

10. The invention as defined in claim 6 wherein the frame panel has a peripheral flange which extends outwardly of the opening on the exterior surface of the wall.

11. The invention as defined in claim 7 wherein the retention connectors are arranged to release the frame panel from its mounted position whenever the air pressure within the passenger compartment exceeds about 1.25 psi above atmospheric pressure.

12. For use in a compartment defined at least partially by a wall, a valve assembly operative for relieving overpressure conditions in the compartment, said valve assembly including a frame panel adapted for mounting in an opening in the wall to fill the opening, passage means formed through the frame panel adapted to define an exhaust passage from the interior of the compartment to the exterior ambient space, flap valve means overlying the exhaust passage for allowing free flow of air in a direction from the interior of the compartment to the exterior while preventing air flow in the opposite direction, and overpressure relief support means for mounting the frame panel in the opening in the wall and adapted to release the frame panel from its mounted position whenever the air pressure within the compartment exceeds a predetermined minimum level above atmospheric pressure.

13. The invention as defined in claim 12 wherein the overpressure relief support means comprises retention connectors about the periphery of the frame panel for resilient engagement with the wall of the compartment.

14. The invention as defined in claim 13 wherein the retention connectors are an integral part of the frame panel and wherein the total area of the frame panel is a plural whole multiple of the total area of the exhaust passage.

\* \* \* \* \*